Jan. 17, 1956 T. M. LEKA 2,731,095
AIRCRAFT ROTOR AND CONTROL THEREFOR
Filed Jan. 3, 1952 2 Sheets-Sheet 1
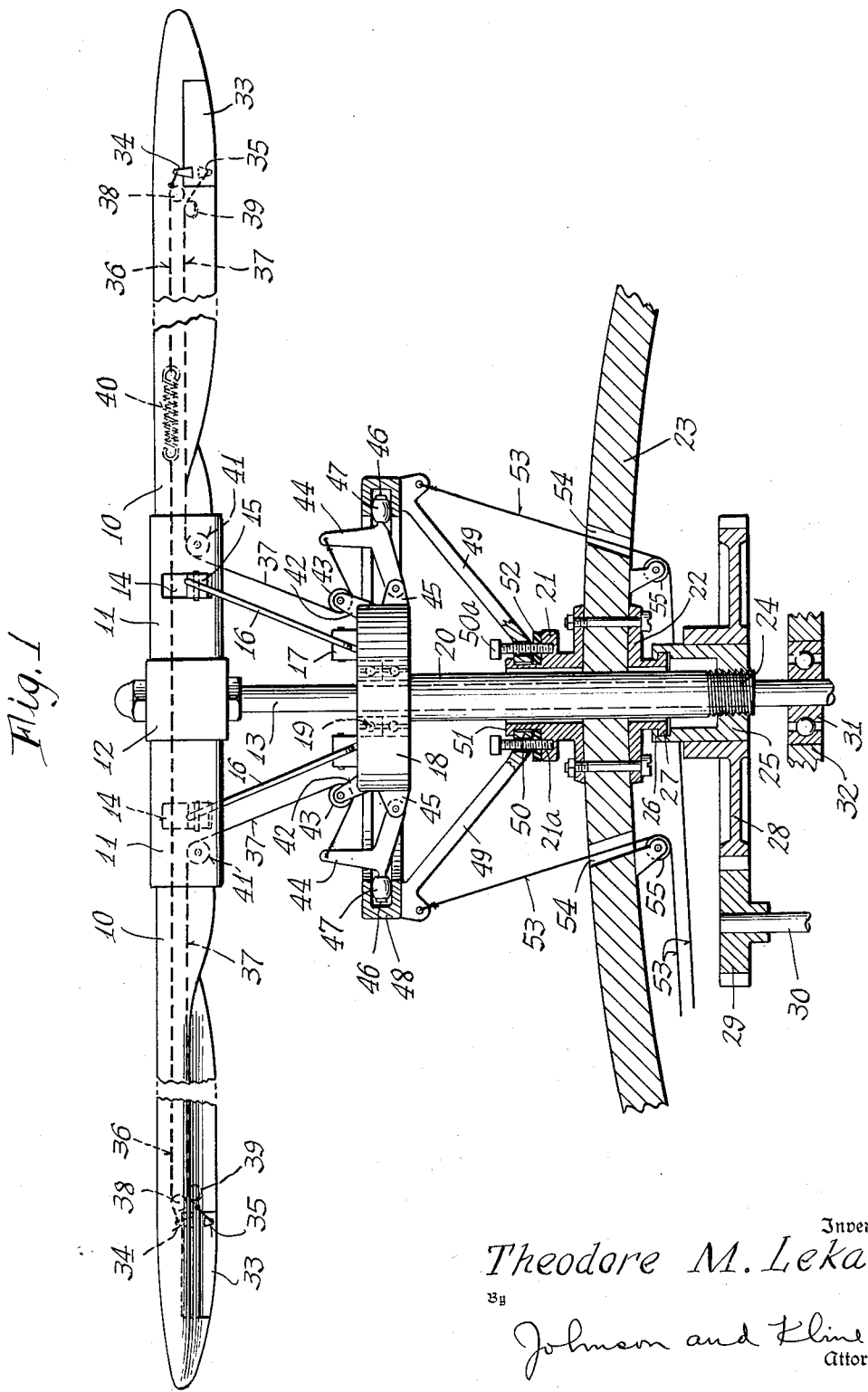
Inventor
Theodore M. Leka
By
Johnson and Kline
Attorneys

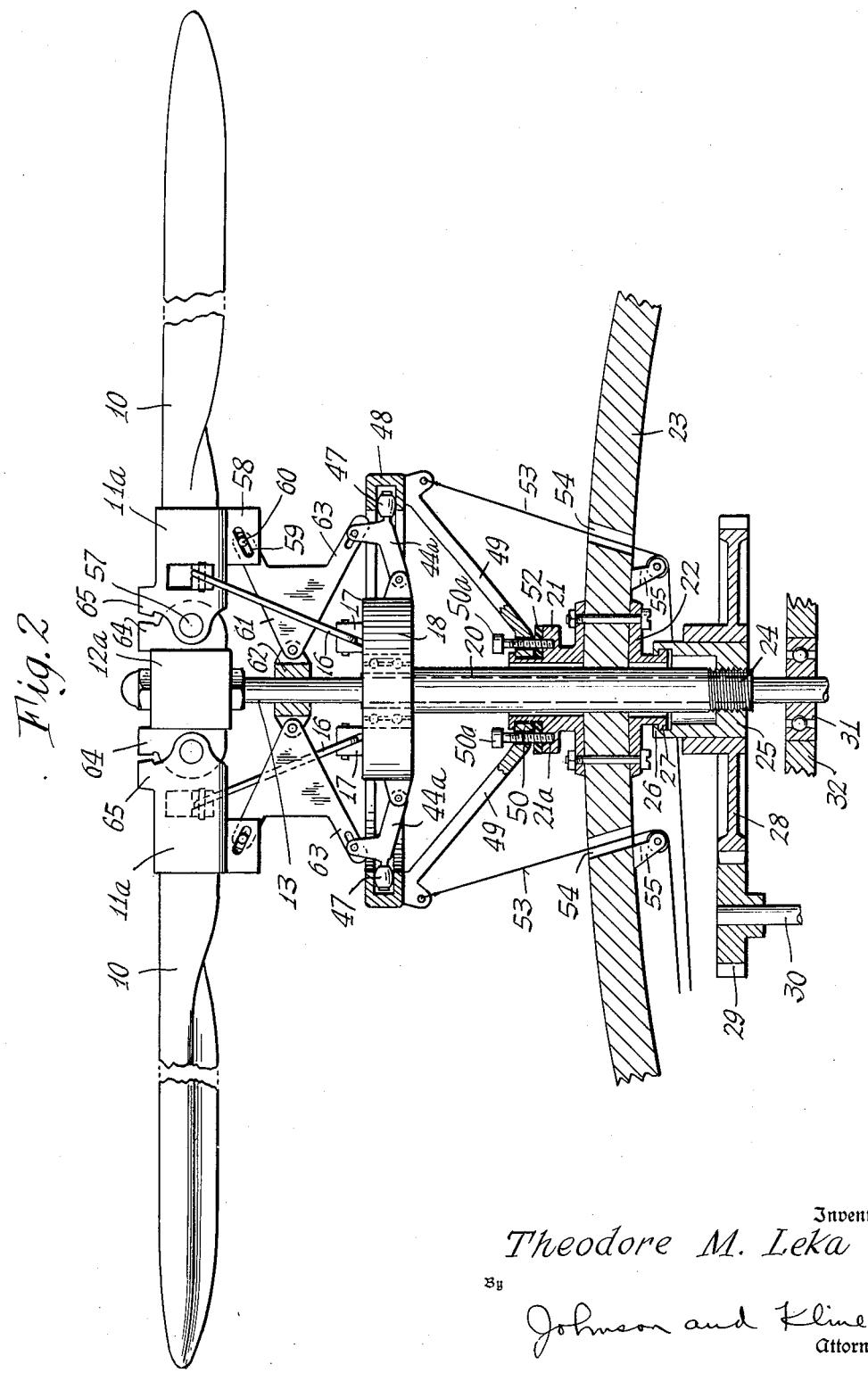

United States Patent Office 2,731,095
Patented Jan. 17, 1956

2,731,095

AIRCRAFT ROTOR AND CONTROL THEREFOR

Theodore M. Leka, Bridgeport, Conn.

Application January 3, 1952, Serial No. 264,736

12 Claims. (Cl. 170—160.25)

This invention relates to the lifting and propelling means of aircraft such as helicopters and the like, and more particularly to the rotor structure and rotor control means of such craft.

An object of the invention is to provide an improved rotor and rotor control for an aircraft, which is extremely simple in construction and effective in operation in providing both lifting force for the craft and lateral force for effecting horizontal travel of the craft.

Another object of the invention is to provide an improved rotor and control means therefor, which is compact in construction and relatively small in size, while at the same time being rugged and reliable in its operation.

A still further object of the invention is to provide an improved rotor and control means as above set forth, which may be easily and quickly, accurately adjusted or actuated to provide the desired lift, or travel in horizontal directions.

Still another object of the invention is to provide an improved and simplified combined variable pitch and flapping control for the rotor blades of an aircraft such as a helicopter or the like, minimizing sudden and severe stresses while at the same time enabling manipulation of the craft to be readily carried out.

In accomplishing the above objects I provide, as illustrated in one embodiment of the invention, variable pitch rotor blades having ailerons incorporated in their trailing portions, said ailerons being oscillated, that is, raised and depressed periodically, in step with the speed of rotation of the rotor blades, and such action being controllable in conjunction with changing the pitch of said blades to the end that ascent, descent, and horizontal movements of the aircraft may be readily effected. In another embodiment of the invention I provide flapping pivots on variable pitch rotor blades, and effect an oscillation or periodic flapping of the blades in step with their rotation, the flapping effecting the horizontal movement of the craft, and the changing of pitch controlling the vertical movements. In this second embodiment of the invention upward flapping movement of the blades is accompanied by an automatic slight increase in blade pitch, and vice versa, which tends to reduce sudden heavy stresses, and to effect a smoother operation and control of the rotor.

Another feature of the invention resides in the simplicity, compactness and small size of the structure utilized in the control of both pitch and flapping of the rotor blades.

Other features and advantages will hereinafter appear.

In the accompanying drawings:

Figure 1 is a side view partly in elevation and partly in vertical section of an improved rotor and control means therefor made in accordance with the invention, characterized by the rotor blades being of variable pitch and having ailerons which are oscillated in step with the rotation of the blades.

Fig. 2 is a view like Fig. 1, but showing another form of the invention wherein almost the entire portion of the rotor blade can flap as well as change its pitch.

The improved rotor and rotor control structure shown in Fig. 1 comprises a pair of rotor blades 10 carried in sockets 11 to have limited turning movement therein, said sockets being mounted on a hub 12 secured to a power driven shaft 13.

While only two rotor blades 10 are shown, it should be understood that a larger number, such as three or four, may be provided equispaced about the hub 12 and controlled as is hereinafter brought out.

The sockets 11 have slots 14 through which apertured lugs 15 extend, said lugs being secured to the shanks of the blades 10 to control the pitch thereof. The lugs 15 are pivotally connected with links 16 pivotally secured to apertured lugs 17 carried on a rotary swash ring 18. The ring 18 is rotatably mounted by means of bearings 19 on a sleeve or hollow shaft 20 which surrounds the power driven shaft 13, and said ring moves axially only with the sleeve by virtue of the restraint of the bearings 19.

The lugs 15 and 17 and links 16 are so arranged that rotation of the hub 12 and sockets 11 will cause simultaneous rotation of the swash ring 18.

For support, the sleeve 20 passes through bearing fittings 21 and 22 secured respectively to the upper and lower sides of the top frame work 23 of the aircraft.

It will be understood that the shaft 13 may be rotated in the sleeve 20 for the purpose of rotating the rotor blades 10. The sleeve 20, however, is secured against rotation in the bearing fittings 21 and 22 as by means of suitable splines, etc. (not shown) but is movable axially a slight amount either upward or downward for the purpose of raising or lowering the swash ring 18 and thereby effecting a change in the pitch of the blades 10 through the linkage connections 16, as will be understood from an inspection of the figure.

In accordance with the present invention the sleeve 20 and structure now to be described, comprise novel and improved means for effecting a change in the pitch of the blades 10, which means is simple, easy to actuate and reliable in its operation. For the purpose of effecting a closely controlled upward and downward shifting of the sleeve 20 I provide screw threads 24 on its lower end, engaged by a threaded nut 25 which is rotatably mounted on the fitting 22 but held thereby against axial movement by interlocking flanges 26 and 27 as shown. The nut 25 may be rotated by various means, such rotation effecting a measured slow yet forceful raising or lowering of the shaft 20 to change the pitch of the blades 10. In Fig. 1, I show the nut 25 as carrying a spur gear 28 engaged by a pinion 29 on a shaft 30 which may be turned in either of reverse directions by a suitable manual control. It will be understood that the shaft 13, while rotatable, is held against axial movement, and any suitable means for accomplishing this may be employed such as a thrust bearing 31 secured to a portion 32 of the frame or body of the aircraft.

I have provided by the above construction a simple, compact and reliable means comprising the concentric shafts 13, 20 and the threaded nut 25 and screw threads 24 on the shaft 20, for effecting a gradual and positive control of the pitch of the blades 10.

In accordance with this invention I provide flapping portions on the blades 10, movable vertically and arranged to be periodically actuated to effect a horizontal traveling movement of the craft. These flapping portions are shown in Fig. 1 as ailerons 33, located on the trailing edges of the blades 10.

The term "flapping" as used herein is intended to denote vertical up and down movements of the ailerons 33, in a direction generally transverse of the mean rotative path of travel of the blades 10. The ailerons 33 have upper and lower arms 34 and 35 respectively connected to cables 36 and 37. The cables 36 and 37 pass around pulleys 38 and 39 within the blades 10, and extend longitudinally inside of said blades toward the hub 12, the blades being made hollow for this purpose. The cables 36 are secured together by a stiff helical extension spring 40, preferably located within one of the blades 10 as shown.

The cables 37 pass over pulleys 41 in the shanks of the blades 10, and pass laterally out through the sockets 11 which are slotted for this purpose. It will be understood that pulling on one or the other of the cables 37 will effect a lowering and raising of the ailerons 33, the ailerons at all times moving opposite to each other.

According to the present invention the ailerons 33 are oscillated, that is, periodically flapped or moved vertically, in step with the rotation of the shaft 13, to effect a horizontal travel of the aircraft. To accomplish this, the swash ring 18 is provided with upstanding apertured lugs 42 carrying pulleys 43 around which the cables 37 are passed. The cables are then connected to levers 44 pivotally mounted on lugs 45 extending radially from the swash ring 18. The levers 44 have extensions 46 carrying rollers 47 which travel in an annular channel-section track 48 mounted by means of spokes 49 and a hub 50 on the upper fitting 21 which is secured to the aircraft frame structure 23.

The hub 50 is retained on the fitting 21 by a suitable flange 51 thereof, and preferably rests on a resilient pad 52 made of rubber or like material. By virtue of the hub 50 having a loose fit with the fitting 21, the track 48 may be tilted out of the horizontal position in which it is shown. Such tilting will effect a selective and periodic actuation of the cables 37 as the swash ring 18 rotates, thereby oscillating the ailerons 33 vertically in step with the speed of rotation of the shaft 13.

Control of the tilting of the track 48 may be accomplished by cables 53 passing through openings 54 in the frame structure 23, and passing over pulleys 55 to suitable manually operable controls.

While only two cables 53 are shown, it should be understood that four are intended to be provided, to enable the track 48 to be tilted in any of the four general horizontal directions in which it is intended that the aircraft travel.

I have thus provided by the present invention, as set forth in the structure described above, improved and simplified rotor and control means for a helicopter or like aircraft, which is compact, small in size, simple in construction and reliable in operation. When the rotor blades 10 are rotating the pitch of the blades may be varied by merely turning the shaft 30 which turns the nut 25 and effects upward or downward axial movement of the hollow shaft 20 and the swash ring 18. Such movement simultaneously changes the pitch of the blades 10 through the links 16.

During such change of pitch no appreciable change in the positions of the ailerons 33 will occur because of the proportioning of the levers 44 to cause slack in the cable 37 to be taken up automatically whenever the swash ring 18 is raised, and to provide slack automatically whenever the swash ring 18 is lowered.

Any tilting of the track 48 as effected by the control cables 53 will result in oscillation of the levers 44 in step with the speed of rotation of the shaft 13 and swash ring 18, and such oscillation will result in flapping of the ailerons 33 to effect horizontal movement of the aircraft in the desired direction.

In the embodiment of the invention shown in Fig. 2 parts which are generally similar in structure and function to those already described above in conjunction with Fig. 1 have been given like reference characters.

In Fig. 2 the varying of the pitch of the blades 10 is accomplished substantially in the same manner and with the same structure as that shown in Fig. 1. The blades 10 in Fig. 2 are, however, not provided with ailerons as set forth above; instead, the blades are carried in sockets 11a mounted by means of flapping pivots 57 on the hub 12a. The sockets 11a have depending portions 58 provided with slots 59 receiving pins 60 carried on bell cranks 61 which are pivotally mounted on a collar 62 secured to the power-driven shaft 13. The bell cranks 61 have slotted arms 63 pivotally connected with levers 44a, the latter being pivotally carried on the swash ring 18.

By the above construction tilting of the track 48, which I term a cycling track, results in flapping of the blades 10 in step with the speed of rotation of the shaft 13. It will be seen that when the track 48 is tilted the levers 44a will be oscillated as the swash ring 18 rotates, causing oscillation of the bell cranks 61 and flapping of the blades 10. Whenever a blade 10 has a downward flapping movement it will result in a slight decrease in the pitch of the blade, since the swash ring 18 retains a fixed axial position normally during flapping of the blades unless the pitch control should also be manipulated. Such simultaneous automatic decrease in pitch with downward flapping movement of the blades, and increase in pitch with upward flapping movement of the blades tends to prevent sudden excessive loads on the rotor which might result in ultimate failure of components, since the reduction of pitch relieves pressure on the blades. It also provides a smoother action, requiring less force on the controls to effect a given adjustment of flapping movement.

As a safety measure, the hub 12a may have upstanding lugs 64 engageable with lugs 65 on the sockets 11a to limit upward movement of the blades if for any reason the flapping control should be rendered inoperative.

In each of Figs. 1 and 2 screws 50a pass through enlarged holes in the hubs 50, said screws being threaded in holes 21a in the flanges 21, thereby to prevent rotation of the track 48.

Variations and modifications may be made within the scope of the claims and portions of the improvements may be used without others.

I claim:

1. In an aircraft, a variable pitch bladed rotor mounted on a drive shaft and rotatable in a horizontal plane, said bladed rotor having portions vertically movable upwardly and downwardly; means for varying the pitch of said blades of the rotor including a rotatable member connected to and rotatable with the bladed rotor and adjustably movable axially of the shaft for varying the pitch of the blades while they are in rotation; and means including linkage means carried by the rotatable member and connected to the bladed rotor and an annular track cooperating with the linkage means to move said portions of the rotor upwardly and downwardly periodically in relation to the speed of rotation of the rotor.

2. In an aircraft, a variable pitch bladed rotor mounted on a drive shaft and rotatable in a horizontal plane, said bladed rotor having portions vertically movable upwardly and downwardly; means for varying the pitch of said blades of the rotor including a rotatable member connected to and rotatable with the bladed rotor and adjustably movable axially of the shaft for varying the pitch of the blades while they are in rotation; and means including linkage means carried by the rotatable member and connected to the bladed rotor and an adjustable annular track cooperating with the linkage means to move said portions of the rotor periodically upwardly and downwardly in relation to the speed of rotation of the rotor, both said rotatable member and said annular track being adjustable during rotation of the rotor.

3. The invention as defined in claim 1 wherein the rotatable member is connected to the blades by links to vary the pitch of the blades in response to said axial movement of the rotatable member on the shaft.

4. The invention as defined in claim 1, in which the vertically movable portions of the blades comprise ailerons located in the trailing edges of the blades.

5. The invention as defined in claim 4, in which the linkage means includes lever means carried by the rotatable member and connected to the ailerons by cables to cause the periodic movement of the ailerons upwardly and downwardly.

6. The invention as defined in claim 5 wherein said cables pass through pulleys carried by the rotatable member.

7. In an aircraft a variable pitch bladed rotor mounted on a drive shaft and rotatable in a horizontal plane, said bladed rotor having a hub and blades pivoted to the hub for upward and downward flapping movement, means for varying the pitch of said blades of the rotor including a rotatable member connected to and rotatable with the bladed rotor and adjustably movable axially of the shaft for varying the pitch of the blades while they are in rotation; and means including linkage means carried by the rotatable member and connected to the bladed rotor and an annular track cooperating with the linkage means to move said blades of the rotor periodically upwardly and downwardly in relation to the speed of rotation of the rotor causing said blades to flap while in rotation.

8. In an aircraft a variable pitch bladed rotor mounted on a drive shaft and rotatable in a horizontal plane, said bladed rotor having a hub and blades pivoted to the hub for upward and downward flapping movement, means for varying the pitch of said blades of the rotor including a rotatable member connected to and rotatable with the bladed rotor and adjustably movable axially of the shaft for varying the pitch of the blades while they are in rotation; and means including linkage means carried by the rotatable member and connected to the bladed rotor by bell crank means and an annular track cooperating with the linkage means to cause said bell crank means to move said blades about their pivots causing said blades to flap while in rotation and simultaneously automatically change their pitch in response to said flapping.

9. In an aircraft a variable pitch bladed rotor mounted on a drive shaft and rotatable in a horizontal plane, said bladed rotor having a hub and blades pivoted to the hub for upward and downward flapping movement, means for varying the pitch of said blades of the rotor including a rotatable member connected to and rotatable with the bladed rotor and adjustably movable axially of the shaft for varying the pitch of the blades while they are in rotation; rotatable member and connected to the bladed rotor by tion; and means including linkage means carried by the bell crank means and an annular track cooperating with the linkage means to cause said bell crank means to move said blades about their pivots causing said blades to flap while in rotation and simultaneously automatically decrease their pitch in response to downward flapping.

10. In an aircraft a variable pitch bladed rotor mounted on a drive shaft and rotatable in a horizontal plane, said bladed rotor having a hub and blades pivoted to the hub for upward and downward flapping movement, means including a rotatable member connected to and rotatable with the bladed rotor and adjustably movable axially of the shaft and a control actuated by the operator for moving said rotatable member and varying the pitch of said blades while they are in rotation; and means including linkage means carried by the rotatable member and connected to the bladed rotor and an adjustable annular track having a control therefor actuated by the operator and separate from the first control for causing said blades to periodically flap in timed relation to their speed of rotation and simultaneously automatically decrease their pitch whenever the flapping is downward.

11. The invention as defined in claim 1 in which the annular track is tiltable to change the amount of upward and downward movement of the portion of the blades while the blades are rotating.

12. In an aircraft having a rotatable variable pitch bladed rotor mounted on a drive shaft and having blades provided with ailerons, means for varying the pitch of said blades while they are in rotation; and means for automatically periodically depressing the ailerons while the blades are in rotation, in timed relation to the speed of rotation, said pitch-varying means including a rotatable swash ring rotatable with the bladed rotor and adjustable axially of the drive shaft, and said means for depressing the ailerons including levers carried by the swash ring to rotate therewith and connected to the ailerons, and a stationary track for oscillating said levers when the ring is rotated.

References Cited in the file of this patent

UNITED STATES PATENTS

| | | |
|---|---|---|
| 2,064,223 | Rothenhoefer | Dec. 15, 1936 |
| 2,296,250 | Bennett | Sept. 22, 1942 |
| 2,443,393 | Landgraf | June 15, 1948 |
| 2,476,516 | Thompson | July 19, 1949 |
| 2,506,210 | Goodson | May 2, 1950 |
| 2,512,461 | Jenny | June 20, 1950 |
| 2,581,773 | Stalker | Jan. 8, 1952 |
| 2,606,622 | Bates | Aug. 12, 1952 |
| 2,631,679 | Hillet et al. | Mar. 17, 1953 |

FOREIGN PATENTS

| | | |
|---|---|---|
| 652,817 | Great Britain | May 2, 1951 |